(12) United States Patent
Hicks (10) Patent No.: US 8,240,319 B2
(45) Date of Patent: Aug. 14, 2012

(54) APPARATUS TO PROCESS USED MATERIALS

(76) Inventor: Aldous Montagu Hicks, High Range (AU)

( * ) Notice: Subject to any disclaimer, the term of this patent is extended or adjusted under 35 U.S.C. 154(b) by 520 days.

(21) Appl. No.: 12/532,558

(22) PCT Filed: Mar. 20, 2008

(86) PCT No.: PCT/AU2008/000399
§ 371 (c)(1),
(2), (4) Date: Sep. 22, 2009

(87) PCT Pub. No.: WO2008/116252
PCT Pub. Date: Oct. 2, 2008

(65) Prior Publication Data
US 2010/0116299 A1 May 13, 2010

(30) Foreign Application Priority Data
Mar. 23, 2007 (AU) ................ 2007901545

(51) Int. Cl.
*B08B 3/00* (2006.01)
*B08B 7/02* (2006.01)
*B08B 7/04* (2006.01)
*B08B 1/02* (2006.01)
*B08B 3/14* (2006.01)
*B08B 3/04* (2006.01)
*B08B 3/12* (2006.01)
*B08B 6/00* (2006.01)

(52) U.S. Cl. ................ 134/63; 134/16; 134/18; 134/32; 134/42; 134/56 R; 134/58 R; 134/61; 134/82; 134/104.2; 134/113; 134/115 R; 134/133; 134/198; 134/199; 134/201

(58) Field of Classification Search ............. 134/16, 134/18, 32, 42, 56 R, 58 R, 61, 63, 82, 104.2, 134/113, 115 R, 133, 198, 199, 201
See application file for complete search history.

(56) References Cited

U.S. PATENT DOCUMENTS
4,573,641 A    3/1986 DeWoolfson et al.
(Continued)

FOREIGN PATENT DOCUMENTS
JP    04-354577 A    12/1992
(Continued)

*Primary Examiner* — Michael Barr
*Assistant Examiner* — Charles W Kling
(74) *Attorney, Agent, or Firm* — David A. Guerra (57) ABSTRACT

An apparatus (1) to process used materials for input into a manufacturing process. The apparatus includes a housing (10) having a top surface (15) and providing a plurality of chambers arranged in descending order. A series of locations (20) are positioned under said top surface and through which used materials are to pass. Each said location being provided for receipt of a predetermined used material. A descending path (25) extends from each said location and provides for the transfer of used material from the respective location successively through the chambers. The chambers include a sensing chamber (30) downstream of said locations and having sensing means (35) operable to sense the composition of used material located within said sensing chamber. The sensing means being operable to activate an alarm if the used material has been placed by a user in an opening for receipt of a different material. A washing/drying chamber (40) downstream of said locations and having means (45) operable to wash and dry used material located within said washing/drying chamber. A processing chamber (50) downstream of said washing/drying chamber and having a processing device (55) operable to reduce the size of used material located within said processing chamber and a storage chamber (60) downstream of said processing chamber and having a series of storage units (65) for receipt of different used material once processed by the apparatus (1).

18 Claims, 6 Drawing Sheets

U.S. PATENT DOCUMENTS

| | | | | |
|---|---|---|---|---|
| 4,919,274 A | * | 4/1990 | Hammond | 209/583 |
| 5,217,538 A | * | 6/1993 | Buchholz et al. | 134/25.4 |
| 5,226,519 A | * | 7/1993 | DeWoolfson | 194/209 |
| 5,372,317 A | * | 12/1994 | Willis | 241/99 |
| 5,423,492 A | | 6/1995 | Willis | |

FOREIGN PATENT DOCUMENTS

| | | |
|---|---|---|
| JP | 09-010750 A | 1/1997 |
| JP | 09010750 A  * | 1/1997 |

* cited by examiner

APPARATUS TO PROCESS USED MATERIALS

CROSS-REFERENCE TO RELATED APPLICATIONS

This application is an U.S. national phase application under 35 U.S.C. §371 based upon co-pending International Application No. PCT/AU2008/000399 filed on Mar. 20, 2008. Additionally, this U.S. national phase application claims the benefit of priority of co-pending International Application No. PCT/AU2008/000399 filed on Mar. 20, 2008 and Australia Application No. 2007901545 filed on Mar. 23, 2007. The entire disclosures of the prior applications are incorporated herein by reference. The international application was published on Oct. 2, 2008 under Publication No. WO 2008/116252.

FIELD OF THE INVENTION

The present invention relates to recycling and in particular to an apparatus to process used materials into separate recycled materials for input into a manufacturing process.

BACKGROUND OF THE INVENTION

Recycling of domestic, commercial and industrial waste is now common throughout the world. In modern cities local authorities and/or private contractors periodically collect recyclable containers, paper and green waste from residents. That waste is then transported to a transfer station where it is separated into different material types and packed into bales or stored in bins. For example, clear glass, green glass, amber glass into bins, Polyethylene Terephthalate (PET) plastic bottles and containers into bales, aluminium cans into bins, High Density Polyethylene (HDPE) plastic bottles and containers into bales, steel cans into bins and paper and green waste into bins.

Referring to the recycling of used materials (such as glass and plastic bottles, metal cans and other such containers), to be used in a manufacturing process the used materials are collected from the transfer station and sent to either a material recovery facility (MRF) or direct to a manufacturing plant. For example, normally glass containers are ground into cullet at a MRF before transfer to glass bottle manufacturers. Plastic containers are ground into flakes at either a MRF or at the plastic container or bottle manufacturing plant. Aluminium and steel cans are compacted at an MRF and are then transported to a smelting plant for processing into ingots. The ingots are then delivered to the can manufacturing plant. Currently, significant time and expense is incurred in collecting bulky commingled dirty used materials from residences for transfer to an MRF where the material needs to be unloaded, separated, sorted, contamination removed creating significant quantities of waste material that must be discarded to landfill, so that the recyclable material can be processed or packed for delivery to a manufacturing plant.

There is a need for an apparatus to conduct processing of recyclable used materials at the site where the material is used and prior to being commingled and then collected by local authorities or contractors. Such an apparatus would significantly decrease the cost of recycling used materials plus enhancing the value of the recycled material as the separating, cleaning, grinding, flaking, compacting and crushing of the used materials would occur at the point of the apparatus. The resultant used materials each in their separate now near pure material form at a substantially reduced volume can then be directly transferred to the respective a manufacturing facility for direct input into the manufacturing process without the need for additional processing and without having been sent to a MRF.

OBJECT OF THE INVENTION

It is an object of the present invention to substantially overcome or at least ameliorate one or more of the disadvantages of the prior art, or to at least provide a useful alternative.

SUMMARY OF THE INVENTION

There is firstly disclosed herein an apparatus to process used materials for input into a manufacturing process; the apparatus including:

a housing having a top surface and providing a plurality of chambers arranged in descending order;

a series of locations positioned under said top surface and through which used materials are to pass, each said location being provided for receipt of a predetermined used material;

a descending path extends from each said location and provides for the transfer of used material from the respective location successively through the chambers; said chambers including:

a sensing chamber downstream of said locations and having sensing means operable to sense the composition of used material located within said sensing chamber; said sensing means being operable to activate an alarm if the used material has been placed by a user in an opening for receipt of a different material;

a washing/drying chamber downstream of said locations and having means operable to wash and dry used material located within said washing/drying chamber;

a processing chamber downstream of said washing/drying chamber and having a processing device operable to reduce the size of used material located within said processing chamber and;

a storage chamber downstream of said processing chamber and having a series of storage units for receipt of different used material once processed by the apparatus.

Preferably, said sensing chamber and washing/drying chamber are located in the same chamber.

Preferably, said sensing chamber and washing/drying chamber are located in different chambers.

Preferably, said apparatus includes gripping means operable to hold used material within said sensing chamber or release said used material along said descending path.

Preferably, said gripping means include an opposing pair of arms located on adjacent sides of the sensing chamber, the arms in an extended position operable to hold used material in said chamber and in a retracted position operable to release used material along said descending path.

Preferably, said apparatus includes hydraulic rams operable to move said arms between said extended and retracted positions.

Preferably, said apparatus includes a lid mounted to said housing and movable between an open and closed position to expose or cover said locations.

Preferably, said apparatus includes a device operable to remove a lid of a container.

Preferably, said apparatus includes a device operable to remove a tamper evident portion of a container.

Preferably, said washing and drying means includes a plurality of nozzles operable to deliver a liquid to wash used material located within said washing/drying chamber.

Preferably, said washing and drying means includes a plurality of nozzles operable to deliver air to dry used material located within said washing/drying chamber.

Preferably, said washing and drying means includes a heating element.

Preferably, said processing device includes at least one scraping, shredding, cutting, granulating, grinding, flaking, crushing or compacting device.

Preferably, said apparatus includes means to displace one or more chambers from said path.

Preferably, said displacement means is operable to displace said washing/drying chamber from said path.

Preferably, said displacement means includes a sliding mechanism.

Preferably, said displacement means includes a guide tray.

Preferably, said apparatus is computer controlled.

Preferably, said apparatus includes a series of chutes operable to direct used material to a predetermined processing device adapted to process that material.

Preferably, said processing chamber includes a series of chutes operable to direct material processed by a processing device to a predetermined storage unit adapted to receive that predetermined material.

There is further disclosed herein a method for processing used materials by use of an apparatus; said apparatus including a housing having a top surface and a plurality of chambers arranged in descending order; said method including:

placing used material at a location positioned under the top surface of said housing, said location being provided for receipt of a predetermined used material;

delivering said used material to a sensing chamber;

sensing the composition of said used material in said sensing chamber to determine if said used material has been placed by a user in a location adapted for receipt of that same material;

delivering said used material to a washing/drying chamber once said used material has been correctly sensed;

washing and/or drying said used material in said washing/drying chamber;

delivering said used material to a processing chamber;

processing said container by operation of a predetermined processing device adapted to receive used material of that same material;

delivering said processed used material to a storage chamber; said storage chamber including a series of storage units for receipt of processed material of different predetermined materials.

BRIEF DESCRIPTION OF THE DRAWINGS

A preferred embodiment of the invention will now be described, by way of example only, with reference to the accompanying drawings, wherein.

DETAILED DESCRIPTION OF THE PREFERRED EMBODIMENTS

In the accompanying drawings, there is schematically depicted an apparatus 1 to process used materials such as containers 5 for input into a manufacturing process. The apparatus 1 includes a housing 10 having a top surface 15 providing a plurality of chambers in descending order. A series of locations 20 are positioned under the top surface 15 through which used material such as containers 5 can pass. Each of the locations 20 are provided for receipt of a predetermined material. A descending channel path 25 extends from each location 20 and provides for the transfer of used material 5 from the respective location 20 successively through the chambers. A sensing chamber 30 is located downstream of the locations 20 and has sensing means 35 operable to sense the composition of the used material 5 located within the sensing chamber 30. The sensing means 35 is operable to activate an alarm or visual indicator (not shown) if the used material 5 has been placed by a user in a location 20 for receipt of a different material. A washing/drying chamber 40 is also located downstream of the location 20 and has means 45 operable to wash and/or dry used material 5 located within the washing/drying chamber 40. In one form, the washing/drying chamber 40 is located in the same chamber as the sensing chamber 30. In another form, the washing/drying chamber 40 is separate to the sensing chamber 30. A processing chamber 50 is located downstream of the washing/drying chamber 40 and has a processing device 55 operable to reduce the size of used material 5 located within the processing chamber 50. A storage chamber 60 is located downstream of the processing chamber 50 and has a series of storage units 65 for receipt of different purer material once processed by the apparatus 1. The storage container 60 could include wheels 67 or the like.

Figure 1:
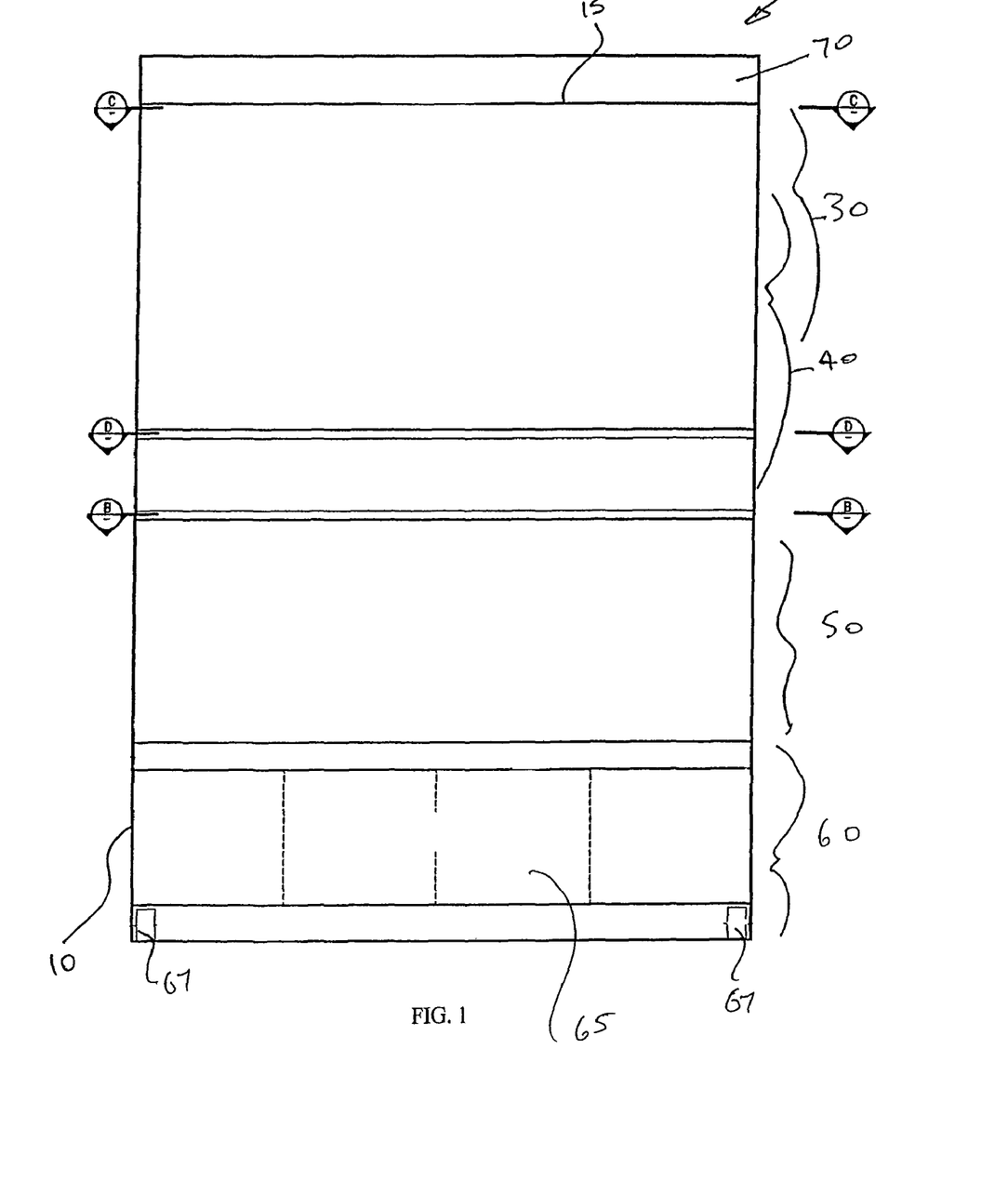
FIG. 1 is a side view of an apparatus to process used materials.

As best seen in FIG. 1, the apparatus 1 includes a lid 70 mounted to the housing 10 and movable between an open and closed position. The lid 70 when in the open position allows access to the locations 20 and the closed position covers the locations 20.

Figure 2:
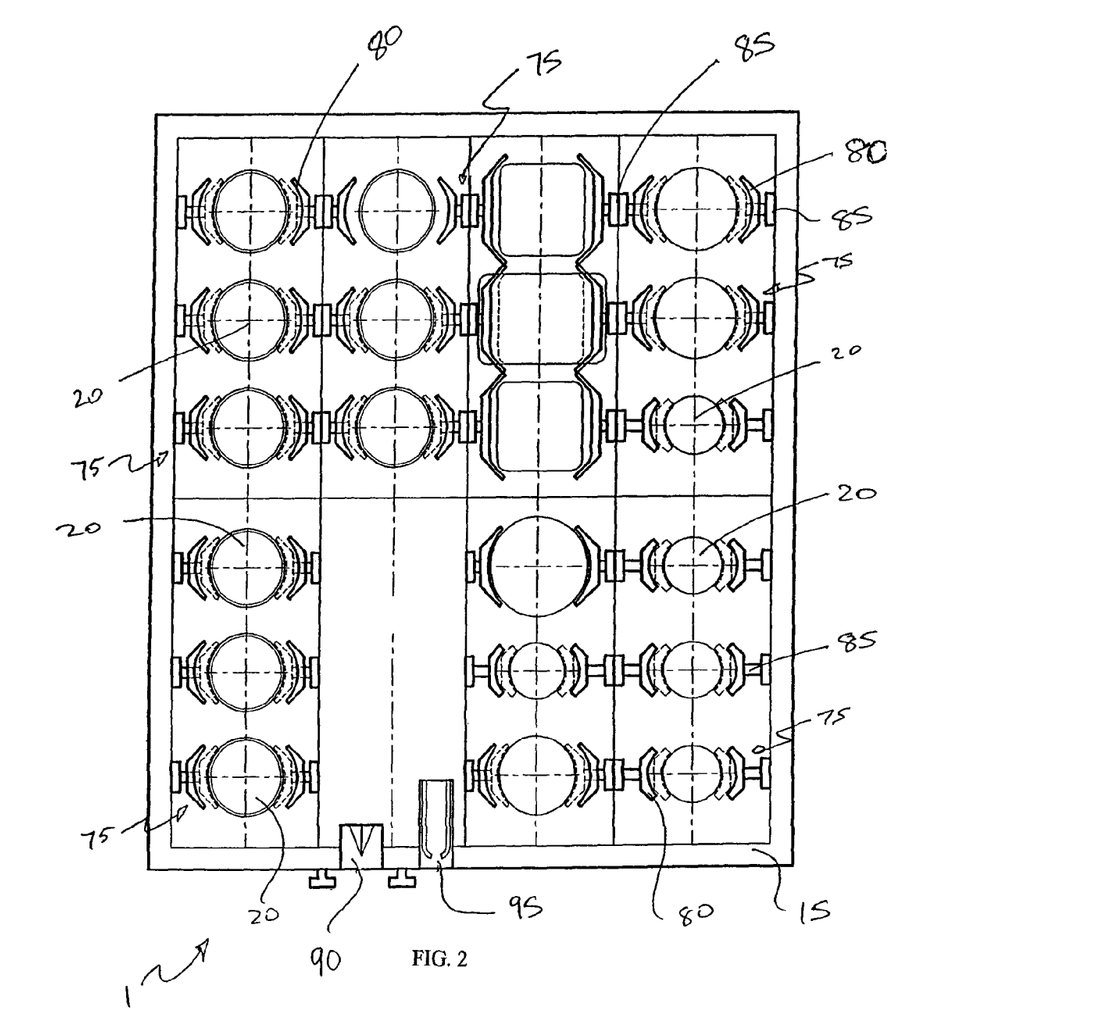
FIG. 2 is a sectional view of the apparatus of FIG. 1 along line C-C.

As best seen in FIG. 2, the apparatus 1 includes gripping means 75 operable to hold used material 5 within the sensing chamber 30 or release the used material 5 along the path 25. The gripping means 75 includes an opposing pair of arms 80 located on adjacent sides of the sensing chamber 30. The arms 80 in an extended position are operable to hold used material 5 in the chamber 30 and in a retracted position are operable to release used material 5 along the path 25. Hydraulic rams, activators or the like 85 move the arms 80 between extended and retracted positions. The arms 80 can be of differing shapes to suit particular used material 5 and be spring loaded or the like. The apparatus 1 also includes a device 90 operable to remove a lid or lid retainer of a container 5 and a device 95 operable to remove a lid or top retainer or tamper evident portion of a container 5.

As best seen in FIGS. 3, 4A, 4B and 5, the processing chamber 50 includes a processing device 52 having at least one scraping, shredding, cutting, granulating, grinding, flaking, crushing or compacting mechanism. The processing device 52 that is utilised by the apparatus 1 will depend upon the particular material to be processed.

Figures 4A, 4B:
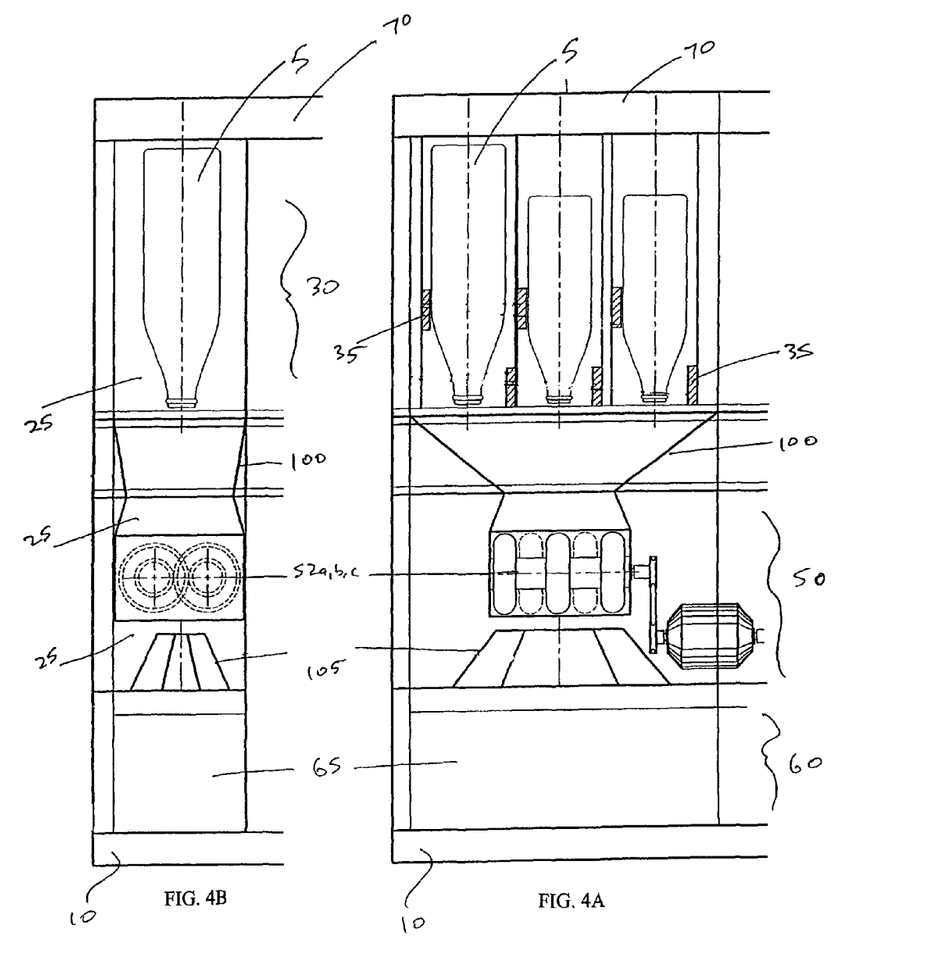
FIGS. 4A and 4B are sectional views of the apparatus of FIG. 3 alone lines E and F.

As best seen in FIGS. 4A and 4B, the apparatus 1 includes a series of chutes 100 operable to direct used material 5 to a predetermined processing device 52 which is adapted to process the material. A further series of chutes 105 direct the processed material to the respective storage units 65.

Figure 6A:
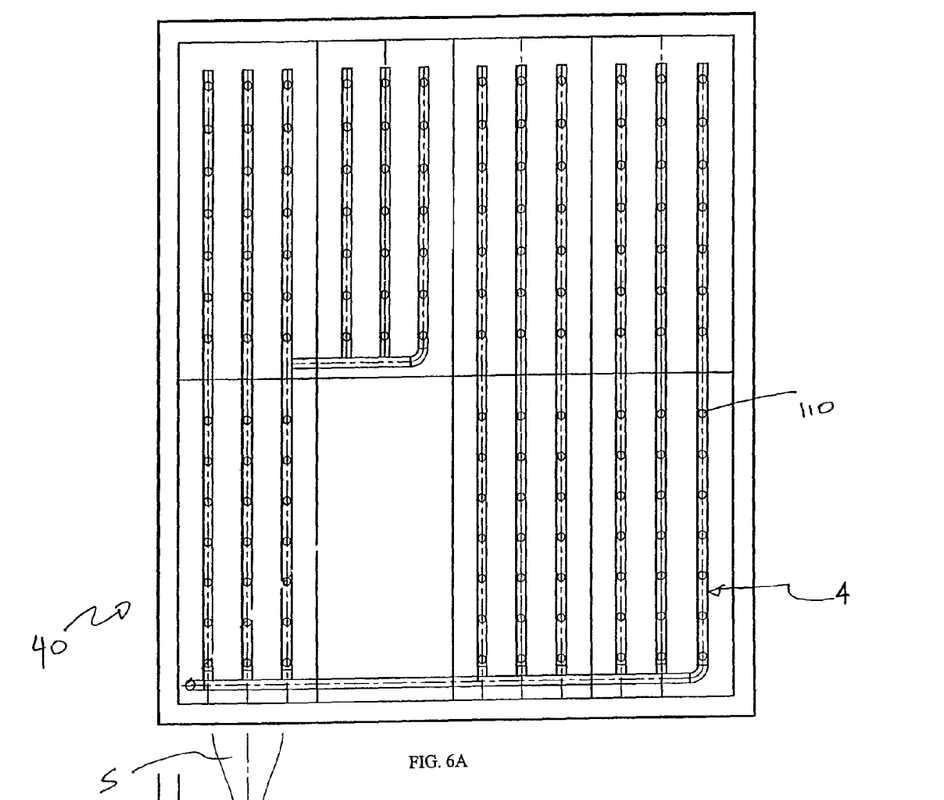
FIGS. 6A and 6B are sectional and side views of the apparatus of FIG. 1 along line D-D.
Figure 6B:
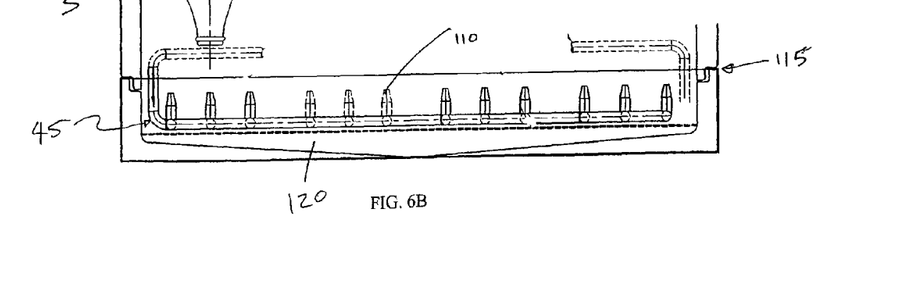

Referring to FIGS. 6A and 6B, the washing/drying chamber 40 includes a plurality of nozzles 110 operable to deliver either liquid or air to the washing/drying chamber 40 to wash and/or dry used material 5 located within the chamber 40. The chamber 40 could also include a heating element (not shown). The apparatus 1 can also includes means to displace one or more chambers from the path. For example, in FIGS. 6A and 6B a displacement means is operable to displace or slide the washing/drying chamber 40 away from the housing 10. The sliding mechanism being a tongue and groove flange 115. However, any typical sliding assembly could be utilised.

In use, the lid 10 is lifted by a user to the open position and will remain up while the apparatus 1 is loaded. The washing and drying chamber 40 must be inserted into the apparatus 1. The user places used material 5 in the correct location 20. For example, green glass into the green glass opening, HDPE in the HDPE location 20, etc. Used material such as containers 5 will be positioned over one of the high pressure spray nozzles 10 to ensure that the insides of the containers 5 are properly cleaned. Each location 20 has a material sensing device 35 which checks the material type. For glass, near infrared systems will detect glass and the glass color. For plastics, the detection is achieved by a laser-induced plasma spectroscopy device. Other detection technologies may also be appropriate depending upon what material composition needs to be sensed. If used material 5 is placed at the incorrect location 20 then an indicator (not shown) will light up and an alarm (not shown) will sound. The apparatus 1 will not be able to start. Additionally, the neck of glass bottles will be checked for metal based materials. Plastic containers will be checked for lids or caps not made of the same material. Laser-induced plasma spectroscopy devices or the like can be utilised to determine if foreign materials are present in the sensing chamber 30. Indicators and alarms will also inform a user of such problems.

As seen in FIG. 2 two devices 90, 95 are located on the outside of the apparatus 1 to allow the easy removal of metal or other anti-tamper devices around the necks of glass bottles and plastic caps or lids not made of the same material as the glass or plastic bottle. In both cases, the neck of a glass bottle or the lid of a plastic bottle will be inserted into the appropriate device 90, 95. The glass bottle device 95 is a claw and scraper device. The lid or top of the plastic contour device 90 will be a scissors action device. Each of these two devices 90, 95 would also store the scraped off metal or cut plastic. The glass bottle device 95 has a place to insert the neck of a glass bottle. The device 95 recognizes that the neck of the bottle has been inserted into it and a multi pronged claw will close in on the neck and then move along the neck of the bottle until it reaches the opening of the bottle. Any metal including the screw top metal lids will be scrapped off the neck and fall into a receptacle. Similarly, the plastic container device 90 has a place to insert the neck of the container 5. The device 90 recognizes that the neck of the container 5 has been inserted. A four bladed open scissor will protrude into the opening of the plastic container. If a lid is on, then the scissors will piece the lid or closure. Once in position, the scissors will close making four equi-distant cuts of the bottle opening. Tamper proof seals, handles and caps and closures will fall from the container into a receptacle (not shown).

Once all used material 5 is checked the lid 70 is closed by the user. The washing and then drying cycle will commence. The washing and drying cycle is very similar to that of an every day washing machine. Any container labels, label glue and food and drink residue will be washed off and solid material will be captured in a removable filter 120. Under each location 20 are multiple lines of spray nozzles 110 positioned to ensure that the hot washing and rinsing water will spray up through the opening of each container 5. The water pressure ensures that the spray reaches the top of the tallest container (~320 mm) at a velocity to ensure that it sprays and splashes around the inner surface areas of the container. Similar to a normal household dishwasher the water will be heated by the apparatus 1 to approximately 60° C. However, any temperature or even cold water could be used. Steam will be used to sterilize and dry the used material 5. The washing and drying chamber 40 includes a motor (not shown), pump (not shown) and drain or filter unit 120. Filters capture any solids that have not been broken down and dissolved into the wash water. The pump motor and drain unit are approximately 40 cm high. The unit is incorporated into a sliding tray which slides into position by sliding mechanism 115.

On completion of the washing and drying cycle the washing/drying chamber 40 slides out of the housing 10 and a tray including chutes 100 slides in. The chutes 100 ensure that the clean and dried used material 5 drop down into the appropriate processing device 52. The apparatus 1 is now ready to process the cleaned and dried used material 5.

Figure 3:
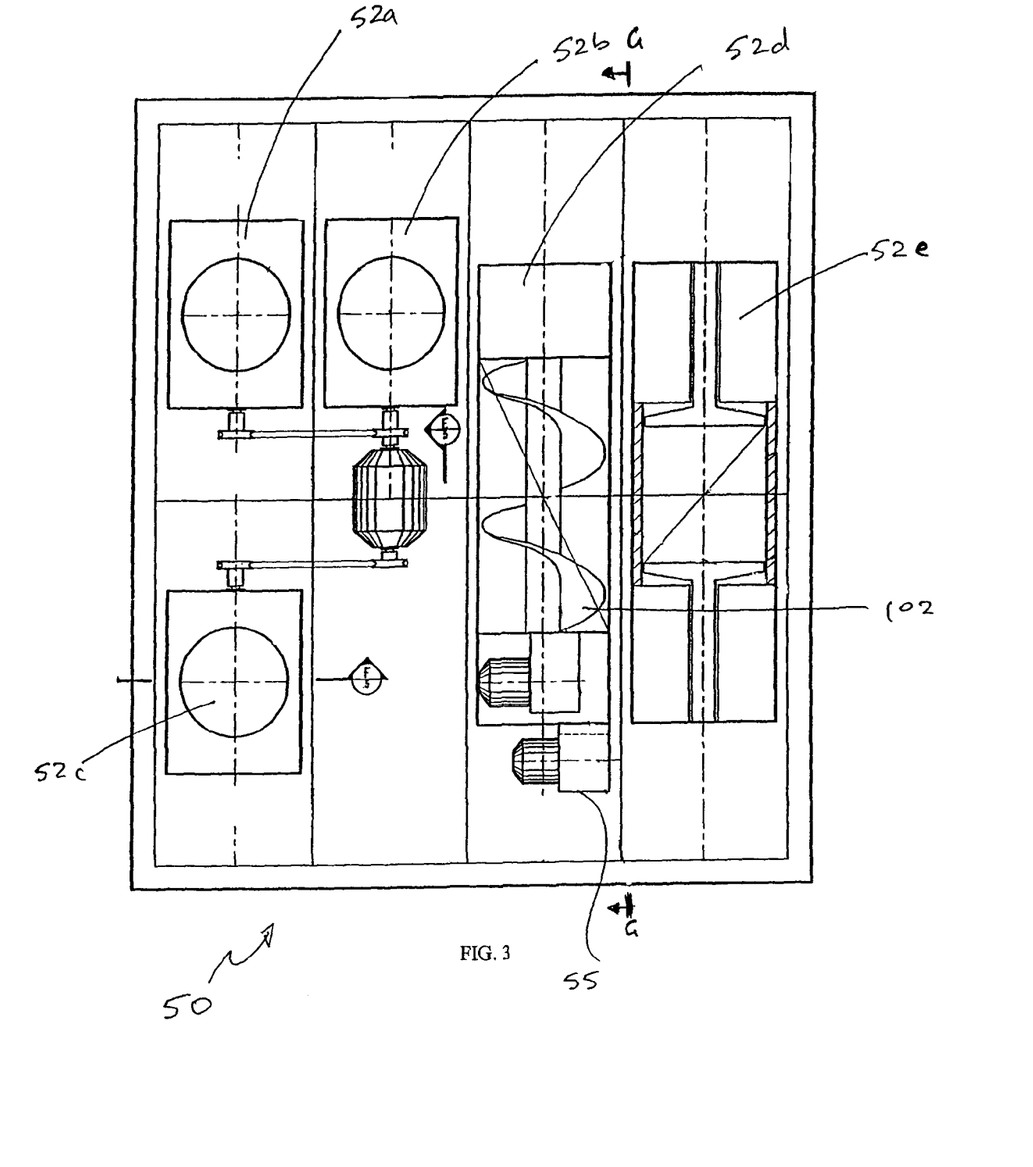
FIG. 3 is a sectional view of the apparatus of FIG. 1 along line B-B.

In a preferred form there will be seven processes performed and they are best seen in FIG. 3. Three for the different colours of glass, two for PET & HDPE plastics, and two for aluminum and steel cans. The treatment for the three glass colors will be a grinding process. To ensure purity of color and to minimize cross-color contamination there will be three separate glass cullet producing machines 52a,b,c. If there is a bottle or jar in any one of the three colored glass bays or locations 20, then each bottle will drop down in turn and be guided into the crusher and grinder. The crusher and grinder unit includes two cylinders side by side enclosed in a steel housing rotating in opposite directions with offset meshed teeth. A bottle is dropped onto the rotating toothed cylinders and is crushed and ground. The crusher and grinder produces pieces of glass or glass cullet with an average size of 6-7 mm or as specified by the manufacturing process. Each of the three grinders, one for each glass color, has a capacity to crush and grind three glass containers of any one colored glass in one minute (180 glass bottles per hour). The rotating crushing and grinding cylinders are driven by an e-motor rated at approximately 0.1 KWs depending on the size of the apparatus. Special hardened steel impellers give maximum wear resistance. The approximate dimensions of the glass crushers and grinders are 155 mm wide by 310 mm long by 155 mm high depending on the size of the apparatus. The cullet drops out from under the crushing and grinding unit and is dispersed by chutes 115 into one of the seven storage units 65. The crushed glass takes up approximately 20% of the original volume of the glass container 5.

Figure 5:
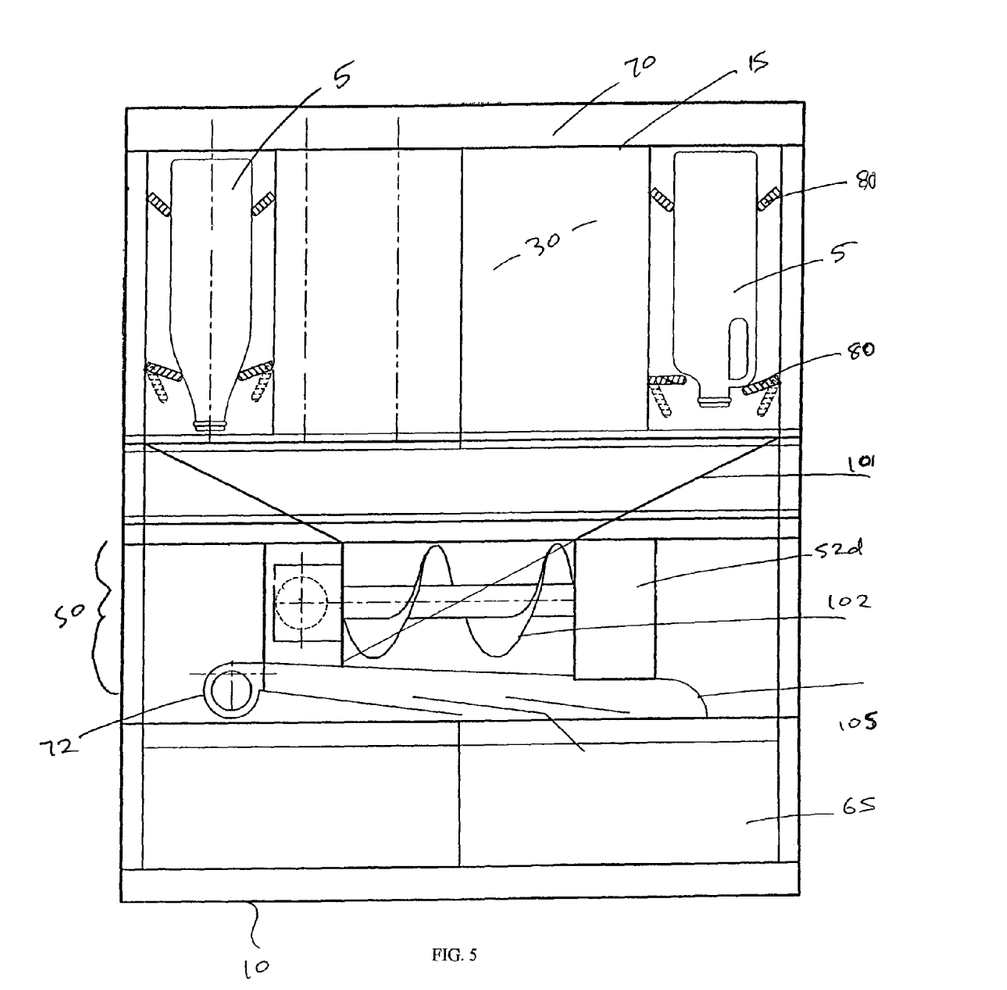
FIG. 5 is a sectional view of the apparatus of FIG. 3 along line G-G.

The processes to produce clean PET and HDPE flakes is very similar. There will be two separate grinding or granulators devices 52d each for PET & HDPE flake production. The grinding or granulating machines 52d will produce clean flakes of 1 to 3 cm or as specified by the manufacturing process. The PET and HDPE flakes are produced and stored separately to ensure zero contamination. PET and HDPE plastic containers 5 drop down from the openings 20 directed by chutes 100 under gravity into separate metal feeder bins (not shown). The bins have an axial screw conveyors 102 or the like which feed the plastic containers 5 into the middle of the processing chamber 50 where rotor and stator blades (not shown) shred the plastic containers 5 to flakes. A vacuum system or the like (a blower 72 is shown in FIG. 5) ensures that the flakes leave the chamber 50 and are dispersed into the appropriate storage units 65. The approximate dimensions of the two plastic granulators are similar in size to the glass crushers, ie. 155 mm wide by 310 mm long by 155 mm high depending on the size of the apparatus. The motor size is approximately 0.4 KW depending on the size of the apparatus.

There will be two separate crushing or compacting machines 52e, one for aluminum and the other for steel cans. The metal (aluminum or steel) cans drop down one at a time directed by chutes under gravity into the processing chamber 50. A cylinder head slides down the processing chamber and crushes the can. After compaction, the can drops out and selector chutes 105 disperse the cans into the storage units 65. The cans are crushed to one quarter of their original size. The unit compacts up to 10 cans per hour depending on the size of the apparatus. The compactor is driven by a 0.3 KW electric motor depending on the size of the apparatus.

Once the containers 5 are processed they are sent to the storage chamber 60. In the preferred embodiment there are seven separate storage units 65. The sizing of each unit 65 is in the order of 350 mm long by 150 mm high by 175 mm wide depending on the size of the apparatus. Each storage unit 65 is enclosed to ensure zero contamination while the storage chamber 60 is outside on the street and could include a locking device or the like (not shown). The seven raw materials in the storage units 65 are then transferred to a vehicle. The emptying method from the units 65 to vehicle is very similar to that used by the existing plastic mobile garbage bins.

When the units 65 are picked up by the vehicle a number of tasks could be performed. For example, retrieving barcodes, weighing the units 65, positioning the units 65 over separate compartments, unloading each separate material, weighing the units 65 after each unloading.

Advantageously, the apparatus 1 receives used materials 5 from where they have been used by a human and prepares them into a suitable form for input directly into a recyclable manufacturing process. For example, the apparatus 1 could be found in residential kitchens, laundries or garages in homes, flats or apartments, in commercial and business premises like offices, factories, shops, conference centres, hotels, farms, other places where people work, where humans consume food and drink beverages like restaurants, cafes, coffee shops, and bars, at cultural venues like museums, galleries and theatres, at entertainment venues, at sporting venues and in public places like parks, parking lots, streets, roads and so on. Advantageously, the used material 5 can be received, checked, treated, stored, transferred and transported for reuse in the manufacturing process in the most efficient manner. The processing of the used material 5 should be in accordance with what is required for the manufacturing process. For example, amber glass needs to be ground into cullets, HDPE (high density polyethylene) plastic should be processed into flakes. Once the storage units 65 are near full the storage chamber 60 can be moved from the apparatus 1 and placed on a street corner or the like as with existing recycling bins for transfer directly to a manufacturing process. An apparatus 1 can process many different materials at the same time, for example, clear, green and amber glass, Polyethylene Terephthalate (PET) and High Density Polyethylene (HDPE) plastic, aluminium and steel cans. The apparatus could also process paper, cardboard, PVC (Polyvinyl Chloride), Low Density Polyethylene (LDPE), Polypropylene (PP), Polystyrene (PS), and most other materials that may want to be recycled. It is envisaged that the apparatus 1 should be about the size of a standard dishwasher.

The key to the success of the operation of the apparatus 1 and the realization of its value is the production of high purity materials. The higher the purity of material, the higher is the consistency of products from multiple sources, and consequentially the higher is the value of the product to the manufacturer. The higher the value to the manufacturer the higher is the value of the material to the apparatus 1 owner. It is estimated that 99% of the various containers made out of glass, PET & HDPE plastics, aluminum & steel cans found in a supermarket could be accommodated by the apparatus 1.

PET bottles that have stored citronella oils, mineral turpentine, kerosene, methylated spirits and any mineral/chemical solvents are unacceptable for recycling back into the direct-food-contact containers. The apparatus 1 could also include the use of FTIR spectroscopic detection techniques which detect chemicals with a single pulse, allowing real-time analysis.

Although the invention has been described with reference to specific examples, it will be appreciated by those skilled in the art that the invention may be embodied in many other forms.

The invention claimed is:

1. An apparatus to process used materials for input into a manufacturing process; said apparatus comprising:
    a housing having a top surface;
    a plurality of locations positioned under said top surface and through which used materials are to pass, each said location being provided for receipt of a predetermined used material;
    a descending path extending from each of said locations and providing for transfer of said used material from said location respectively and successively through sensing, washing and drying, and processing chambers;
    a sensing chamber downstream of each of said locations, said sensing chamber having at least one sensing means operable to sense said used material's composition located within said sensing chamber, said sensing means being in communication with an alarm;
    a gripping means operable to hold said used material within said sensing chamber or release said used material along said descending path;
    at least one washing and drying chamber downstream of said locations and having means operable to wash and dry said used material located within said washing and drying chamber;
    a processing chamber downstream of said washing and drying chamber, said processing chamber having at least one processing device operable to reduce the size of said used material located within said processing chamber;
    a storage chamber downstream of said processing chamber, said storage chamber having multiple storage units for receipt of different used material once processed by said apparatus; and
    displacement means operable to displace said washing and drying chamber from said path.

2. The apparatus according to claim 1, wherein said sensing chamber and said washing and drying chamber are located in a same chamber.

3. The apparatus according to claim 1, wherein said gripping means is an opposing pair of arms located on adjacent sides of said sensing chamber, said arms in an extended position operable to hold said used material in said chamber and in a retracted position operable to release said used material along said descending path, and wherein said gripping means further comprising hydraulic rams operable to move said arms between said extended and retracted positions.

4. The apparatus according to claim 1 further comprising a lid mountable to said housing and movable between an open and closed position to expose or cover said locations.

5. The apparatus according to claim 1 further comprising a device operable to remove a lid of a container.

6. The apparatus according to claim 1 further comprising a device operable to remove a tamper evident portion of a container.

7. The apparatus according to claim 1, wherein said washing and drying means is a plurality of nozzles operable to deliver a fluid to wash and dry said used material located within said washing and drying chamber.

8. The apparatus according to claim 1, wherein said fluid is selected from the group consisting of a liquid, and air.

9. The apparatus according to claim 1, wherein said washing and drying means further comprising at least one heating element.

10. The apparatus according to claim 1, wherein said processing device further comprising at least one device selected from the group consisting of a scraping, shredding, cutting, granulating, grinding, flaking, crushing, and compacting device.

11. The apparatus according to claim 1, wherein said displacement means further comprising a sliding mechanism.

12. The apparatus according to claim 1, wherein said displacement means further comprising a guide tray.

13. The apparatus according to claim 1 further comprising a computer in communication with and operable to control said apparatus.

14. The apparatus according to claim 1, wherein said processing device is a plurality of processing devices including at least one glass cullet producing device for processing glass materials, at least one grinding device for processing plastic materials, and at least one crushing device for processing metal can materials.

15. The apparatus according to claim 1 further comprising a series of chutes operable to direct said used material to at least one predetermined said processing device adapted to process a corresponding said used material.

16. The apparatus according to claim 1 further comprising a series of chutes operable to direct material processed by each of said processing devices to a predetermined said storage unit adapted to receive that predetermined processed material.

17. A used material processing system comprising:
a housing having a top surface;
a plurality of locations positioned under said top surface and through which used materials are to pass, each said location being provided for receipt of a predetermined used material;
a descending path extending from each of said locations and providing for transfer of said used material from said location respectively and successively through sensing, washing and drying, and processing chambers;
a sensing chamber downstream of each of said locations, said sensing chamber having at least one sensing means operable to sense said used material's composition located within said sensing chamber, said sensing means being in communication with an alarm;
a gripping device operable to hold said used material within said sensing chamber or release said used material along said descending path, said gripping device having an opposing pair of arms located on adjacent sides of said sensing chamber, said arms in an extended position operable to hold said used material in said chamber and in a retracted position operable to release said used material along said descending path, each of said arms being operable by at least one hydraulic ram adapted to move said arms between said extended and retracted positions;
at least one washing and drying chamber downstream of said locations, said washing and drying chamber having a plurality of nozzles operable to deliver a fluid to wash and dry said used material located within said washing and drying chamber;
a processing chamber downstream of said washing and drying chamber, said processing chamber having a plurality of processing devices each being operable to reduce the size of a predetermined said used material;
a storage chamber downstream of said processing chamber, said storage chamber having multiple storage units for receipt of different used material once processed by said apparatus;
a series of first chutes located between said washing and drying chamber and said processing chamber, each of said first chutes being operable to direct said used material to a predetermined said processing device which is adapted to process said predetermined said used material;
a series of second chutes located between said processing chamber and said storage chamber, each of said second chutes being operable to direct said used material processed by said processing device to a predetermined said storage unit of said storage chamber; and
a displacement device having a sliding mechanism operable to displace said washing and drying chamber from said descending path.

18. A method for processing used materials by use of an apparatus, said method comprising the steps of:
providing an apparatus comprising: a housing having a top surface; a plurality of locations positioned under said top surface and through which used materials are to pass; a descending path extending from each of said locations; a sensing chamber being downstream of said locations and having at least one sensing means; an alarm in communication with said sensing means; a gripping means operable to hold said used material within said sensing chamber or release said used material along said descending path; at least one washing and drying chamber downstream of said locations and having means operable to wash and dry said used material located within said washing and drying chamber; a processing chamber downstream of said washing and drying chamber and having a processing device operable to reduce the size of said used material located within said processing chamber; a storage chamber downstream of said processing chamber, said storage chamber having multiple storage units for receipt of different used material once processed by said apparatus; and displacement means operable to displace said washing and drying chamber from said path;
placing said used material in at least one of said locations positioned under said top surface of said housing, said location being provided for receipt of a predetermined used material;
delivering said used material to said sensing chamber;
holding said used material in said sensing chamber by use of said gripping means;
sensing the composition of said used material in said sensing chamber;
determining if said used material in said sensing chamber placed by a user in said location is adapted for receipt of that same material;
activating said alarm if said used material in said sensing chamber is different then said predetermined used material for that said location;
releasing said gripping means and delivering said used material to said washing and drying chamber once said used material has been correctly sensed;

washing and/or drying said used material in said washing and drying chamber;

delivering said used material to said processing chamber;

processing said used material by operation of a predetermined said processing device adapted to receive said used material of that same material;

delivering said processed used material to said storage chamber; and receiving in each of said storage units of said storage chamber a different predetermined processed used material.

* * * * *